United States Patent [19]
Johnson

[11] Patent Number: 5,614,679
[45] Date of Patent: Mar. 25, 1997

[54] RECESSED PRESSURE INDICATOR REGULATOR ASSEMBLY

[75] Inventor: Joseph B. Johnson, Beech Grove, Ind.

[73] Assignee: Regin Manufacturing, Inc., Indianapolis, Ind.

[21] Appl. No.: 534,024

[22] Filed: Sep. 26, 1995

[51] Int. Cl.$^6$ .................................................. G01L 7/00
[52] U.S. Cl. ............................................. 73/756; 137/557
[58] Field of Search ................................ 137/557; 73/756

[56] References Cited

U.S. PATENT DOCUMENTS

| 3,949,966 | 4/1976 | Fabish. |
| 5,119,844 | 6/1992 | Cannon et al. ........................ 137/557 |

*Primary Examiner*—Richard Chilcot
*Assistant Examiner*—Joseph L. Felber
*Attorney, Agent, or Firm*—Locke Reynolds

[57] ABSTRACT

A pressure indicator regulator assembly for a gas flow control device is disclosed for indicating the pressure of gas in a container. The pressure indicator regulator assembly includes a regulator housing integrally formed with a gas flow control device attached to a high pressure gas container. A tubular spiral coil pressure indicator is disposed within a recessed notch defined by the regulator housing and is in sealed fluid connection with the gas container through a stepped bore bushing disposed in a stepped bore passage. A cover having a transparent outer surface is removably attached to the housing at the notch, and forms a smooth, essentially continuous surface with respect to the exterior surface of the housing.

17 Claims, 4 Drawing Sheets

5,614,679

RECESSED PRESSURE INDICATOR REGULATOR ASSEMBLY

BACKGROUND OF THE INVENTION

1. Field of the Invention

The present invention generally relates to the field of gas flow control devices, and more particularly concerns a pressure indicator regulator assembly for a gas flow control device for displaying the pressure of a contained gas, such as therapeutic oxygen.

2. Description of the Prior Art

With respect to the use of gas stored in a high pressure container, for instance, therapeutic oxygen in a cylinder stored at 500–2000 p.s.i.g., it is frequently desirable to deliver the gas at a constant flow rate as may be determined by medical or other requirements. Such flow rate may vary from as little as 0.25 liters per minute to greater than 15 liters per minute. In such circumstances, it is necessary to reduce the high pressure of the contained gas to a regulated, essentially lower constant pressure suitable for delivery at a predetermined flow rate.

Available regulators for gas flow control devices frequently include a pressure indicator that is threadably attached to and in fluid connection with the regulator so as to display gas pressure, and is disposed to project from the main body of the gas flow control device. As a result of such pressure indicators projecting from the gas flow control device, there is a tendency for hoses connected to the gas flow control device to become caught upon or looped around the pressure indicators, thereby interfering with the proper flow of the gas. Further, such projecting pressure indicators are subject to collision with foreign objects resulting in damage to the pressure indicator, the regulator, or the gas flow control device, especially during movement of the gas flow control device.

Despite the availability of such regulators and pressure indicators, there exists a need in the art for a pressure indicator regulator assembly for use with a gas flow control device that is capable of indicating the pressure of gas, yet has a regulator and a pressure indicator formed as an assembly that does not project from the body of the gas flow control device.

SUMMARY OF THE INVENTION

In order to aid in the understanding of the present invention, it can be stated in essentially summary form that it is directed to a pressure indicator regulator assembly that is capable of use with a gas flow control device to display the pressure of gas, with the pressure indicator portion formed adjacent to the regulator portion without projecting from the main body of the gas flow control device.

More specifically, the present invention is directed to a pressure indicator regulator assembly for a gas flow control device suitable for attachment to an oxygen cylinder or other high pressure source of gas. The gas flow control device includes a body of generally cylindrical form, with attachment of the body to an oxygen or similar high pressure cylinder by an integral, generally U-shaped yoke that is bored and tapped to receive a clamp screw having a handle. The gas flow control device also includes a flow control valve having a control knob for adjusting the gas flow at a predetermined rate.

The pressure indicator regulator assembly of the present invention includes a regulator housing having a generally cylindrical exterior surface. The regulator housing is integrally formed with the body, defining a gas inlet bore, a regulator cavity, a gas outlet bore, a recessed notch and a passage. The pressure indicator regulator assembly is positioned for sealed fluid connection between the gas inlet bore and the gas outlet bore. The gas inlet bore provides for sealed fluid connection, upon tightening of the clamp screw, with the conventional outlet of the gas cylinder to which the gas flow control device is secured, thereby admitting gas at high pressure to the gas flow control device. The gas inlet bore includes a larger bore proximate to the yoke, a coaxial intermediate bore opening into the passage, and a coaxial smaller bore proximate to the regulator cavity. An annular valve seat protrudes into the regulator cavity a small distance to facilitate sealed fluid connection with a gas flow regulator. Disposed proximate to the outlet bore is the flow control valve. The notch defines a partial disk-shaped volume formed by a generally planar rectangular rear surface, a generally planar arched first end surface, and a generally planar arched second end surface. The rear surface has opposing, shorter rear surface first and second edges, and is disposed with rear surface first and second edges generally parallel to the axis defined by the regulator housing. Opposing first and second end surfaces are disposed between the rear surface first and second edges and normal to the rear surface, with the passage connecting the intermediate bore with the rear surface. The regulator housing defines a pair of opposing grooves disposed parallel to the body, with one groove proximate to each of the rear surface first and second edges. The regulator housing also defines a pair of opposing slots, one slot disposed proximate to each of the first and second end surfaces. The passage is formed as a stepped-bore including a smaller inner passage disposed proximate to the gas inlet bore and a coaxial larger outer passage disposed proximate to the notch, with a passage annular shoulder interposed between the inner passage and the outer passage. The gas flow regulator is disposed within the regulator cavity and is maintained in sealed fluid connection between the inlet bore and the outlet bore.

A pressure indicator is disposed within the notch and is maintained in sealed fluid connection with the passage. The pressure indicator includes a flattened tubular coil having a closed first end and an open second end, with the coil disposed to form a flexible, generally planar spiral with the first end proximate to the circumferential edge of the coil and the second end proximate to the center of the coil. A bushing defines a stepped-bore orifice including a smaller inner orifice, a coaxial larger outer orifice, and a coaxial exterior bushing annular shoulder disposed at the end of the bushing proximate to the inner orifice. The bushing is located within the outer passage so that the inner orifice is proximate to the inlet bore. An O-ring is disposed around the bushing at the bushing annular shoulder and bears against the passage annular shoulder, making sealed fluid connection between the bushing and the passage. A connecting tube is partially disposed through the stepped-bore orifice and is attached between the second end and the bushing so that sealed fluid connection is made between the bushing and the coil. A pointer is attached to the coil proximate to the first end, and an indicia plate is removably attached to the rear surface proximate to the pointer by a pair of threaded fasteners, each disposed in a tapped hole. As a result of the sealed fluid connections, variations in fluid pressure in the gas inlet bore cause variations in the diameter of the planar spiral formed by the coil, producing movement of the pointer with respect to the indicia plate by movement of the first end in the plane defined by the coil.

A partial disk-shaped pressure indicator cover includes a transparent, rounded outer surface having opposing outer surface first and second edges, a generally planar arched first side surface and a generally planar arched second side surface. The radius of the outer surface is substantially the same as the radius of the regulator housing, and the first and second side surfaces are disposed adjacent to opposing edges of and normal to the axis of the outer surface. First and second side surfaces each defines a recessed channel and each includes an arm flexibly and resiliently formed with the first and second side surfaces proximate to the channels. A projecting finger is integrally formed with each of the arms, and a pair of ribs integrally formed with pressure indicator cover are disposed with one rib proximate to and parallel with each of the outer surface first and second edges. The dimensions of the cover are chosen so that the cover is capable of engaging the notch with the axis defined by the outer surface coaxial with the axis defined by the regulator housing, the first side surface disposed adjacent to the first end surface, and the second side surface disposed adjacent to the second end surface. In this way, the outer surface and the exterior of the regulator housing may be disposed to form a generally smooth, continuous cylindrical surface. The cover may be positioned with the arms disposed so that the fingers are proximate to the slots and the ribs are proximate to the grooves, whereby the cover may be removably attached to the regulator housing within the notch by flexion of the arms with respect to the cover, with each finger disposed within one of the slots and each rib disposed within one of the grooves.

The present invention is of compact and streamlined design, with the pressure indicator capable of displaying the pressure of gas in the high pressure cylinder without projecting from the main body of the gas flow control device. Consequently, the propensity for hoses connected to the gas flow control device to become caught upon or looped around the pressure indicator is minimized, and the potentiality for collisional damage to the pressure indicator and the gas flow control device is lessened.

In use, the gas flow control device is removably attached to an oxygen or similar high pressure cylinder at the yoke by tightening the clamp screw using the handle, whereby gas may enter the present invention through the gas inlet bore. By virtue of sealed fluid connections between the gas inlet bore, the passage, the bushing, the connecting tube, and the coil, variations in gas pressure within the high pressure gas cylinder causes variations in pressure of gas present within the coil. As a result of the flexibility of the coil, the spiral defined by the coil slightly wraps or unwraps in response to decreases or increases in the gas pressure, whereby the pointer is caused to move in the path of an arc with respect to the indicia plate. In this way, the pressure of gas within the high pressure cylinder may be ascertained by observation through the transparent outer surface. In order to provide adjustment or service to the pressure indicator, the cover may be removed from the notch by inserting a bladed object such as a screwdriver into the channels and bearing against the arms, thereby disengaging the fingers from the slots.

It is an object of the present invention to provide a pressure indicator regulator assembly for a gas flow control device that is of streamlined, compact design that minimizes the likelihood that hoses connected to the gas flow control device become caught upon or looped around the pressure indicator.

It is another object of the present invention to provide a pressure indicator regulator assembly for a gas flow control device that is of streamlined, compact design the minimizes likelihood that a projecting pressure indicator will be subject to collision with foreign objects.

It is another object of the present invention to provide a pressure indicator regulator assembly for a gas flow control device that is capable of accurately and reliably indicating the pressure present in a high pressure gas container.

It is yet another object of the present invention to provide a pressure indicator regulator assembly for a gas flow control device that is sturdy, durable and reliable, yet may be easily and quickly maintained and serviced.

Further objects and advantages of the present invention will be apparent from a study of the following portion of the specification, the claims, and the attached drawings.

DESCRIPTION OF THE PREFERRED EMBODIMENT

The following portion of the specification, taken in conjunction with the drawings, sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
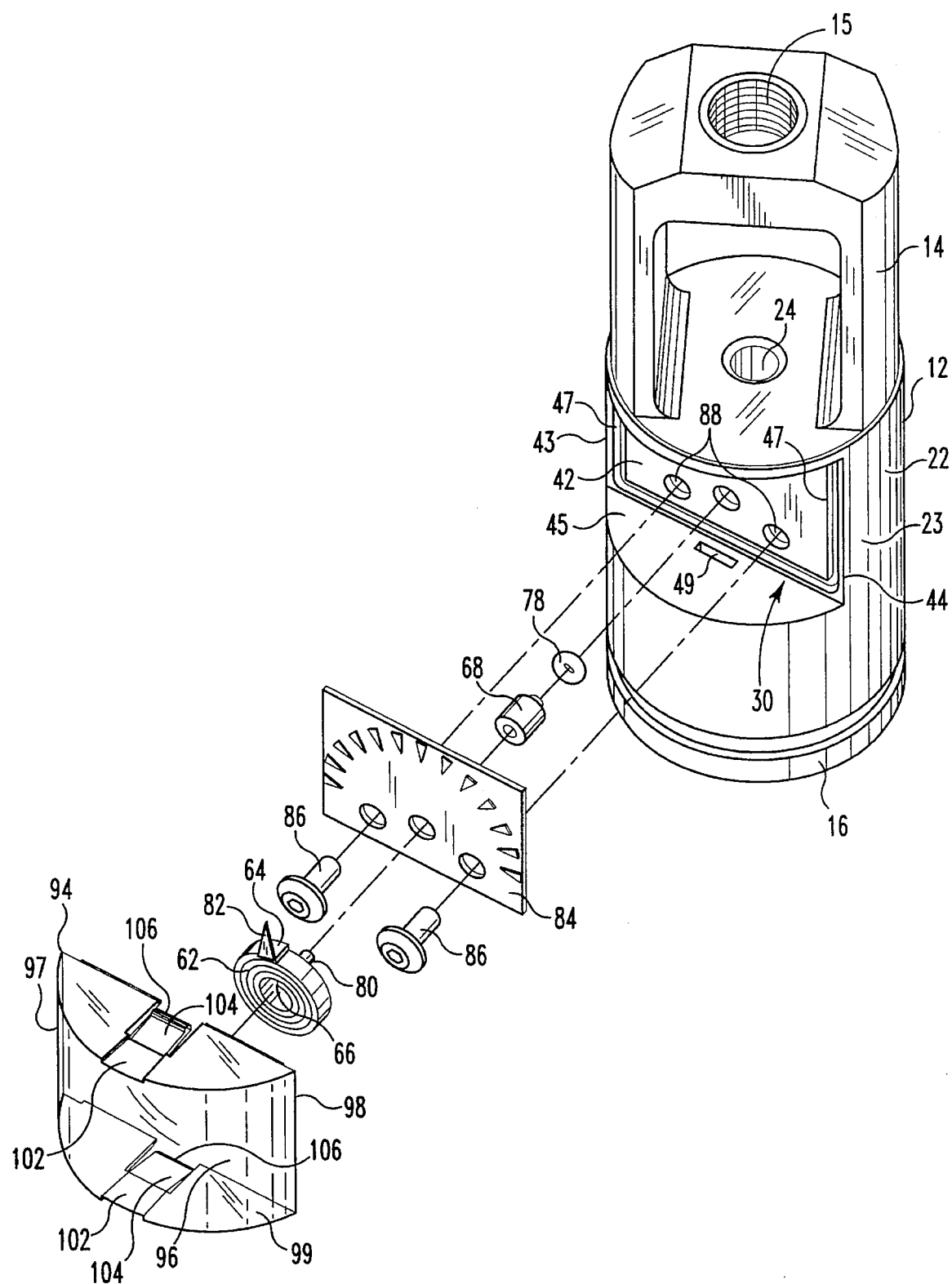
FIG. 1 is an exploded perspective view of a pressure indicator regulator assembly representing the present invention.
Figure 2:
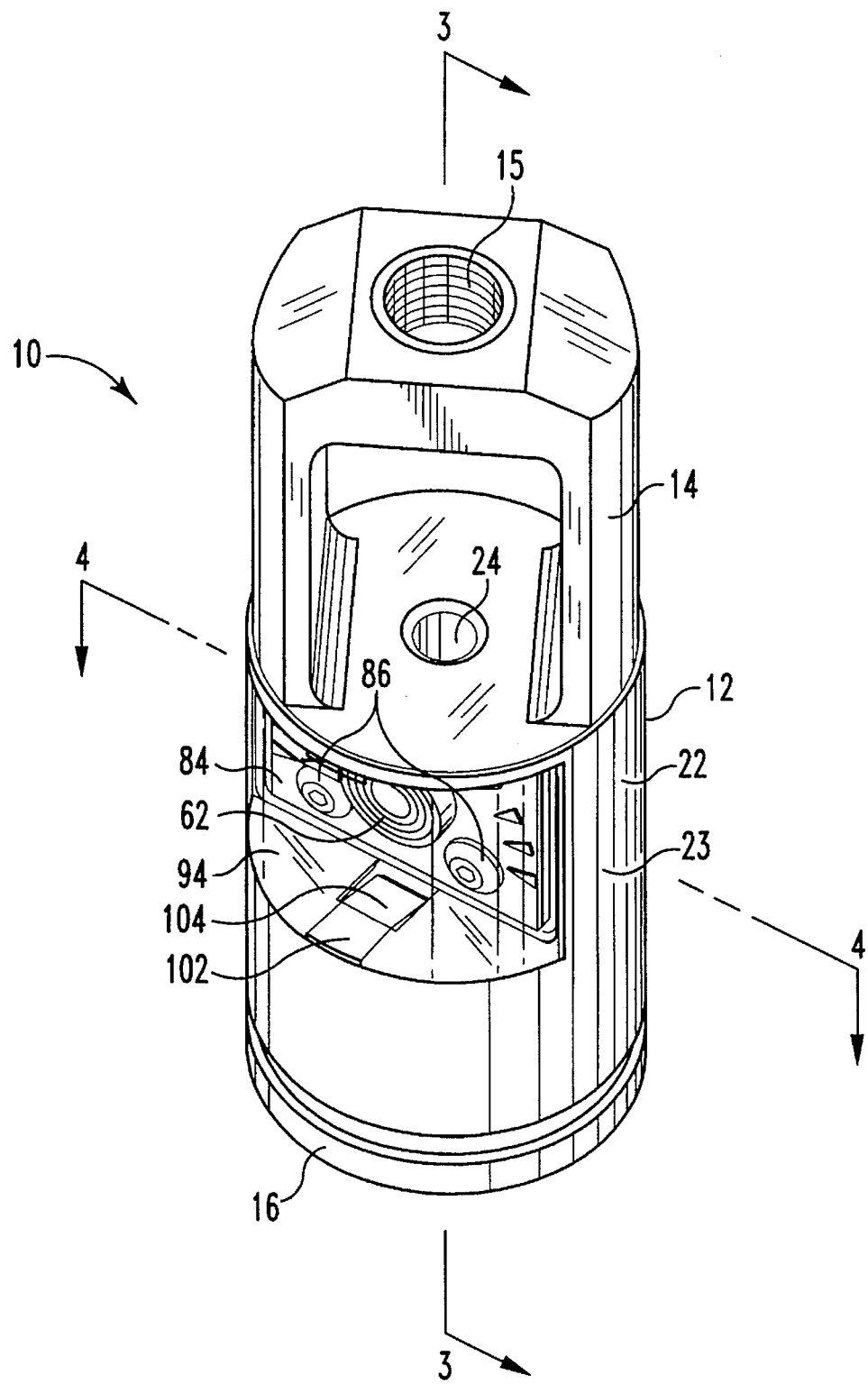
FIG. 2 is a perspective view of a pressure indicator regulator assembly representing the present invention.

Referring now to the drawings for a detailed description of the present invention, reference is first made to FIGS. 1–2, generally depicting gas flow control device 10 suitable for attachment to an oxygen cylinder, not shown, or other high pressure source of gas. Gas flow control device 10 includes body 12 of generally cylindrical form. Body 12 is provided with a generally U-shaped yoke 14 that defines threaded yoke bore 15 for threadably receiving a clamp screw and handle, not shown, for attachment of gas flow control device 10 to the oxygen or similar high pressure gas cylinder. Disposed proximate to control end 16 of gas flow control device 10 is a flow control valve means, not shown, having a control knob for adjusting gas flow control device 10 to deliver a predetermined rate of gas flow.

With reference to FIGS. 1–4, depicted generally at 20 is the pressure indicator regulator assembly for gas flow control device 10 of the present invention. Pressure indicator regulator assembly 20 includes regulator housing 22 integrally formed with body 12, having generally cylindrical exterior surface 23, and defining gas inlet bore 24, regulator cavity 26, gas outlet bore 28, recessed notch 30 and passage 32. Pressure indicator regulator assembly 20 is positioned for sealed fluid connection between gas inlet bore 24 and gas outlet bore 28. Gas inlet bore 24 provides fluid connection, upon tightening of the clamp screw, with the conventional outlet of the gas cylinder to which gas flow control device 10 is secured, thereby admitting gas at high pressure to gas flow control device 10. Gas inlet bore 24 is formed as a three-section coaxial stepped bore, including larger bore 34 proximate to yoke 14, intermediate bore 35 fluidly connecting with passage 32, and smaller bore 36 opening to regulator cavity 26. Annular valve seat 38 protrudes into regulator cavity 26 by a small distance to effectuate sealed fluid connection between a gas flow regulator, not shown, and inlet bore 24. Notch 30 defines a partial disk-shaped volume formed by generally planar rectangular rear surface 42, generally planar arched first end surface 45 and generally planar arched second end surface 46. Rear surface 42 has opposing, shorter rear surface first and second edges 43 and 44, and is disposed with rear surface first and second edges 43 and 44 generally parallel to the axis defined by regulator housing 22. Opposing first and second end surfaces 45 and 46, respectively, are disposed between rear surface first and second edges 43 and 44 and normal to rear surface 42. Passage 32 is disposed fluidly connecting intermediate bore 35 with rear surface 42. Regulator housing 22 defines a pair of opposing grooves 47 disposed parallel to body 12 with one groove 47 proximate to each of rear surface first and second edges 43 and 44. Regulator housing 22 also defines a pair of opposing slots 49, with one slot 49 disposed at each of first and second end surfaces 45 and 46. Passage 32 is formed to define a stepped-bore including smaller inner passage 50 disposed proximate to gas inlet bore 24, and coaxial larger outer passage 52 disposed proximate to notch 30, with passage annular shoulder 54 interposed between inner passage 50 and outer passage 52. The gas flow regulator is disposed within regulator cavity 26 and is maintained in sealed fluid connection between inlet bore 24 and outlet bore 28.

Figure 3:
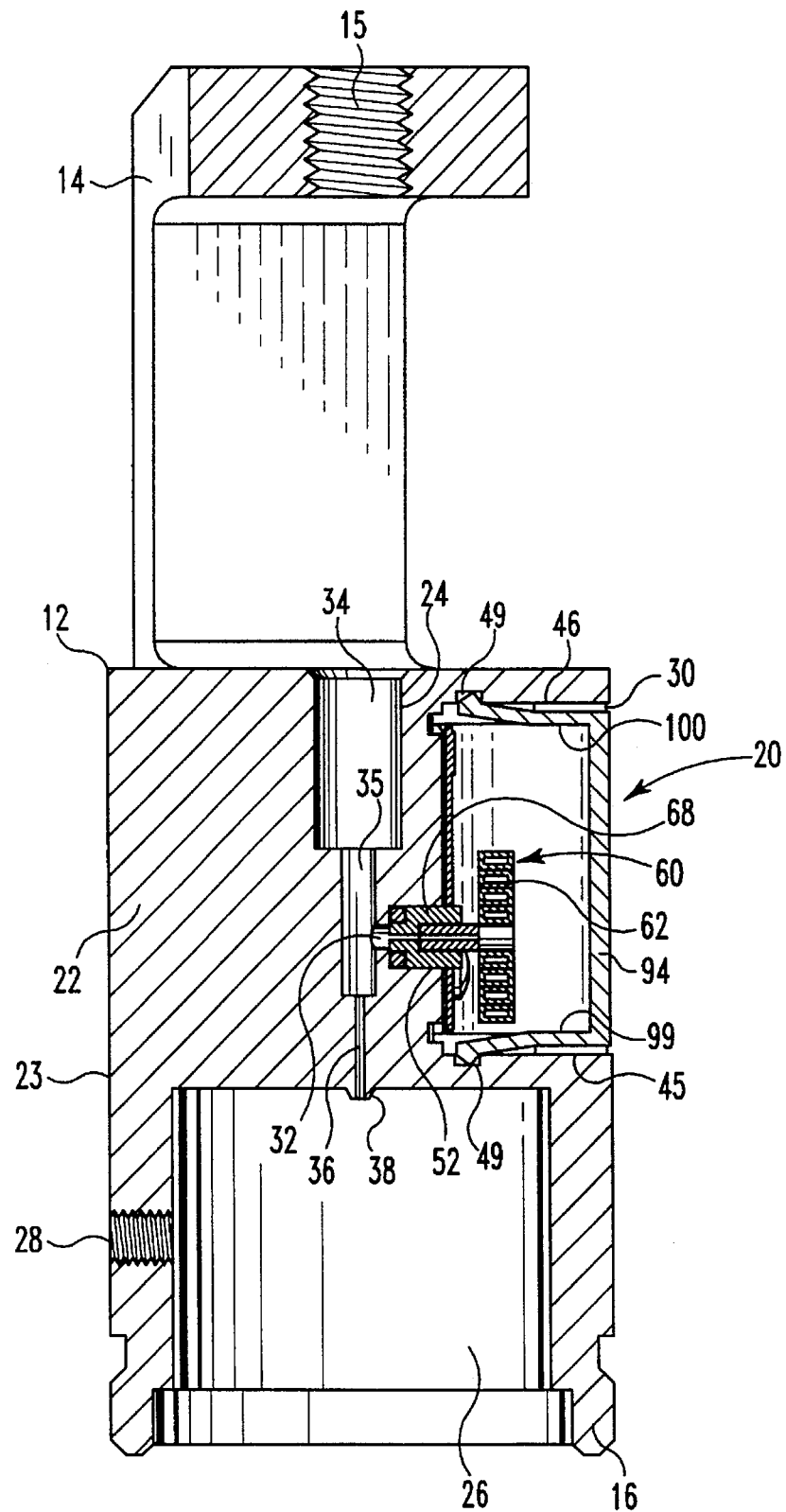
FIG. 3 is an enlarged sectional view of a pressure indicator regulator assembly representing the present invention, taken along line 3—3 of FIG. 2.
Figure 4:
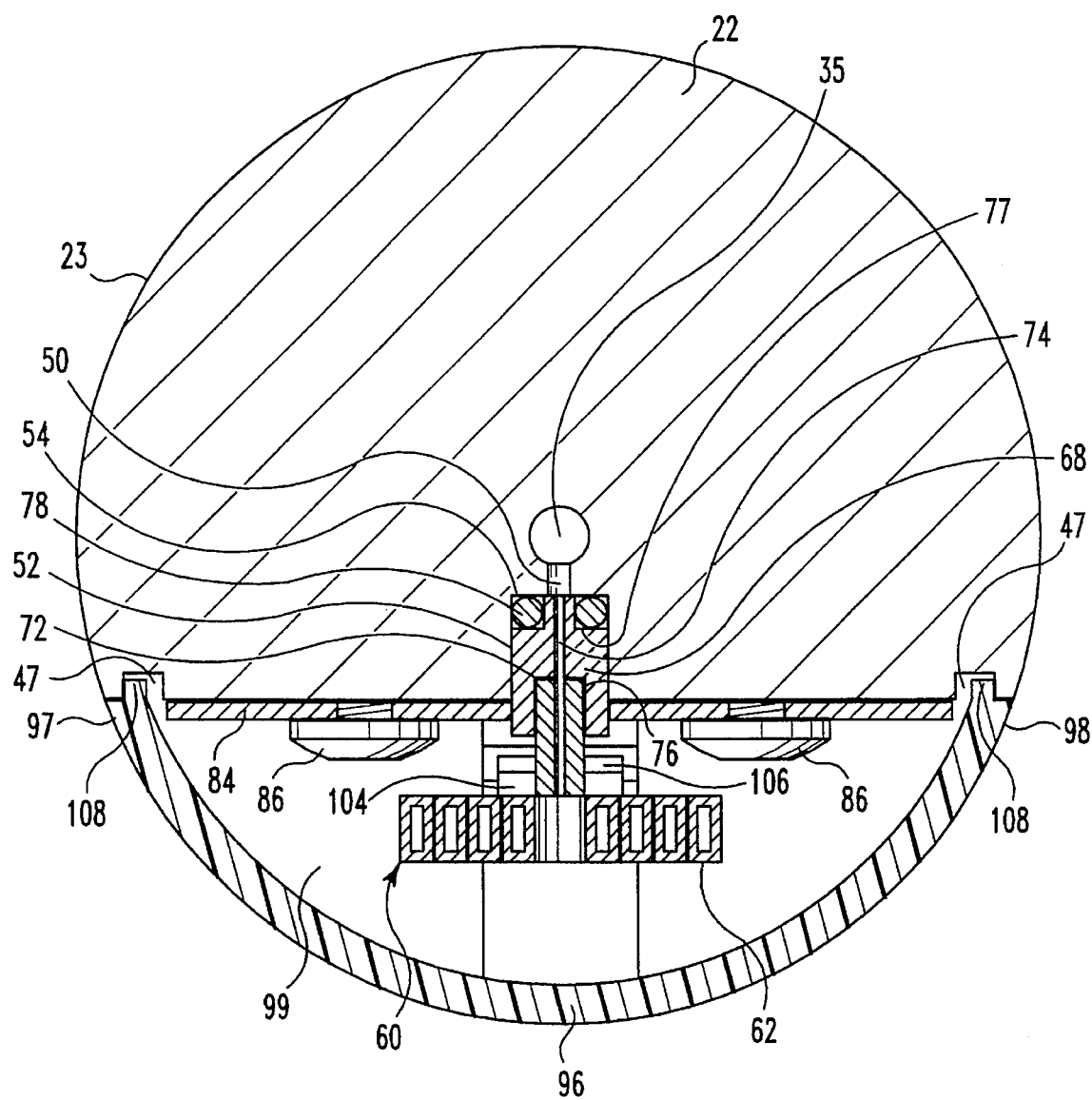
FIG. 4 is an enlarged sectional view of a pressure indicator regulator assembly representing the present invention, taken along line 4—4 of FIG. 2.

As depicted in FIGS. 2–4, pressure indicator 60 is disposed within notch 30 and is maintained in sealed fluid connection with passage 32. Pressure indicator includes flattened tubular coil 62 having closed first end 64 and open second end 66, with coil 62 disposed to form a flexible, generally planar spiral with first end 64 proximate to the circumferential edge of coil 62 and second end 66 proximate to the center of coil 62. Bushing 68 defines stepped-bore orifice 72, including smaller inner orifice 74, larger outer orifice 76, and bushing annular shoulder 77 disposed at an end of busing 68 proximate to inner orifice 74. Bushing 68 is located within outer passage 52 so that inner orifice 74 is proximate to inlet bore 24. O-ring 78 is disposed around busing 68 at bushing annular shoulder 77 and bears against passage annular shoulder 54 so that sealed fluid connection may be made between bushing 68 and passage 32. Connecting tube 80 is partially disposed through stepped-bore orifice 72 and is attached between second end 66 and bushing 68 so that sealed fluid connection is made between bushing 68 and coil 62. In this way, variations in fluid pressure in gas inlet bore 24 cause variations in the diameter of the planar spiral formed by coil 62, producing movement of first end 64 in the plane defined by coil 62. Pointer 82 is attached to coil 62 proximate to first end 64, and indicia plate 84 is removably attached to rear surface 42 proximate to pointer 82 by a pair of threaded fasteners 86, each disposed in a tapped hole 88.

As seen in FIGS. 1–4, partial disk-shaped pressure indicator cover 94 includes transparent, rounded outer surface 96 having outer surface first edge 97 and outer surface second edge 98, generally planar arched first side surface 99 and generally planar arched second side surface 100. The radius of outer surface 96 is substantially the same as the radius of regulator housing 22, and first and second side surfaces 99 and 100 are disposed adjacent to opposing edges of and normal to the axis of outer surface 96. First and second surfaces 99 and 100 each defines a recessed channel 102 and includes an arm 104 flexibly and resiliently formed with first and second side surfaces 99 and 100 proximate to channels 102. A projecting finger 106 is integrally formed with each arm 104. A pair of ribs 108 integrally formed with pressure indicator cover 94 are disposed with one rib 108 proximate to and parallel with each of outer surface first and second edges 97 and 98. The dimensions of cover 94 are chosen so that cover 94 is capable of engaging notch 30 with the axis defined by outer surface 96 coaxial with the axis defined by regulator housing 22, first side surface 99 disposed adjacent to first end surface 45, and second side surface 100 disposed adjacent to second end surface 46, so that outer surface 96 and the exterior of regulator housing 22 may be disposed to form a generally smooth, continuous cylindrical surface. Cover 94 may be positioned with arms 104 disposed so that fingers 106 are proximate to slots 49 and ribs 108 are proximate to grooves 47, whereby cover 94 may be removably attached to regulator housing 22 within notch 30 by flexion of arms 104 with respect to cover 94, with each finger 106 disposed within one of slots 49 and each rib 108 disposed within one of grooves 47.

The present invention is seen to be compact and of relatively streamlined, modern design with pressure indicator 60 capable of displaying the pressure of gas in the high pressure cylinder without projecting from body 12 of gas flow control device 10. Consequently, the tendency for hoses connected to gas flow control device 10 to become caught upon or looped around pressure indicator 60, interfering with the proper flow of the gas, is eliminated by the present invention. Further, by virtue of the streamlined construction of the present invention, and disposition within recessed notch 30 and cover 94, the potentiality for collisional damage to pressure indicator 60 and gas flow control device 10 is greatly lessened.

In use, gas flow control device 10 is removably attached to an oxygen or similar high pressure cylinder proximate to yoke 14 by tightening the clamp screw using the handle, whereby gas may enter the present invention through gas inlet bore 24. By virtue of the sealed fluid connections between gas inlet bore 24, passage 32, bushing 68, connecting tube 80, and coil 62, variations in gas pressure within the high pressure gas cylinder causes variations in pressure of gas present within coil 62. As a result of the flexibility of coil 62, the spiral defined by coil 62 slightly wraps or unwraps in response to decreases or increases in the gas pressure, whereby pointer 82 is caused to move in the path of an arc with respect to indicia plate 84. In this way, the pressure of gas within the high pressure cylinder may be ascertained by observation through transparent outer surface 96. In order to provide adjustment or service to pressure indicator 60, cover 94 may be removed from notch 30 by inserting a bladed object such as a screwdriver into channels 102 and bearing against arms 104, thereby disengaging fingers 106 from slots 49.

The present invention having been described in its preferred embodiment, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. A pressure indicator regulator assembly for a gas flow control device, the pressure indicator regulator assembly being positioned in sealed fluid connection between a gas inlet and a gas outlet respectively defined in the gas flow control device, the pressure indicator regulator assembly comprising:

a regulator housing having an exterior surface and defining a gas inlet bore, a regulator cavity, a gas outlet bore, a recessed notch and a passage, said gas inlet bore capable of sealed fluid connection with the gas inlet, said regulator cavity disposed fluidly connecting said inlet bore and said outlet bore, said gas outlet bore capable of sealed fluid connection with the gas outlet, and said passage disposed fluidly connecting said inlet bore and said recessed notch;

a pressure indicator disposed within said notch and in sealed fluid connection with said passage;

a pressure indicator cover having a transparent surface formed to substantially correspond to said exterior surface proximate to said notch; and means for removably attaching said cover within said notch so that said transparent surface and said exterior surface form a generally smooth, continuous surface.

2. A pressure indicator regulator assembly for a gas flow control device as defined in claim 1, wherein:

said regulator housing defines a plurality of slots disposed within said notch; and said means for removably attaching said cover within said notch comprises a plurality of arms, each arm having a projecting finger, said arms flexibly and resiliently attached to said cover whereby said cover is removably attachable to said regulator housing within said notch by flexing said arms with respect to said cover and disposing each of said fingers within one of said slots.

3. A pressure indicator regulator assembly for a gas flow control device as defined in claim 2, wherein said exterior surface is generally cylindrical.

4. A pressure indicator regulator assembly for a gas flow control device as defined in claim 3, wherein said pressure indicator comprises:

a tubular coil having a closed first end and an open second end, said coil disposed to form a flexible, generally planar spiral with said first end proximate to the circumferential edge of said coil and said second end proximate to the center of said coil;

a connecting tube, disposed through said passage and attached between said second end and said regulator housing whereby sealed fluid connection is made between said inlet bore and said coil, and variations in fluid pressure in said inlet bore cause variations in the diameter of the planar spiral formed by said coil, producing movement of said first end;

a pointer attached to said coil proximate to said first end; and indicia disposed proximate to said pointer.

5. A pressure indicator regulator assembly for a gas flow control device as defined in claim 3, wherein said pressure indicator comprises:

a tubular coil having a closed first end and an open second end, said coil disposed to form a flexible, generally planar spiral with said first end proximate to the circumferential edge of said coil and said second end proximate to the center of said coil;

a bushing defining an orifice, said bushing disposed within said passage;

a seal means whereby sealed fluid connection is made between said orifice and said passage;

a connecting tube attached between said second end and said orifice whereby sealed fluid connection is made between said bushing and said coil, and variations in fluid pressure in said inlet bore Cause variations in the diameter of the planar spiral formed by said coil, producing movement of said first end;

a pointer attached to said coil proximate to said first end; and an indicia plate attached to said regulator housing within said notch and disposed proximate to said pointer.

6. A pressure indicator regulator assembly for a gas flow control device, the pressure indicator regulator assembly being positioned in sealed fluid connection between a gas inlet and a gas outlet respectively defined in the gas flow control device, the pressure indicator regulator assembly comprising:

a regulator housing having a generally cylindrical exterior surface and defining a gas inlet bore, a regulator cavity, a gas outlet bore, a recessed notch and a passage, said gas inlet bore capable of sealed fluid connection with the gas inlet, said regulator cavity disposed fluidly connecting said inlet bore and said outlet bore, said gas outlet bore capable of sealed fluid connection with the gas outlet, and said passage disposed fluidly connecting said inlet bore and said recessed notch;

a pressure indicator disposed within said notch and in sealed fluid connection with said passage;

a pressure indicator cover having a transparent outer surface formed as a portion of a cylindrical surface having radius substantially the same as the radius of said regulator housing, the dimensions of said cover chosen so that said cover is capable of engaging said notch with the axis defined by said outer surface coaxial with the axis defined by said regulator housing, said outer surface and the exterior of said regulator housing forming a generally smooth, continuous cylindrical surface; and means for removably attaching said cover within said notch.

7. A pressure indicator regulator assembly for a gas flow control device as defined in claim 6, wherein:

said regulator housing defines a plurality of slots disposed with said notch; and said means for removably attaching said cover within said notch comprises a plurality of arms, each arm having a projecting finger, said arms flexibly and resiliently attached to said cover whereby said cover is removably attachable to said regulator housing within said notch by flexing said arms with respect to said cover and disposing each of said fingers within one of said slots.

8. A pressure indicator regulator assembly for a gas flow control device as defined in claim 7, wherein said pressure indicator comprises:

a tubular coil having a closed first end and an open second end, said coil disposed to form a flexible, generally planar spiral with said first end proximate to the circumferential edge of said coil and said second end proximate to the center of said coil;

a seal;

a connecting tube attached to said second end and removably attached to said regulator housing with said seal interposed between said tube and said regulator housing whereby sealed fluid connection is made between said inlet bore and said coil, and variations in fluid pressure in said inlet bore cause variations in the diameter of the planar spiral formed by said coil, producing movement of said first end in the plane defined by said coil;

a pointer attached to said coil proximate to said first end; and an indicia plate attached to said regulator housing within said notch and disposed proximate to said pointer.

9. A pressure indicator regulator assembly for a gas flow control device as defined in claim 7, wherein:

said passage is formed to define a stepped-bore including a smaller inner passage disposed proximate to said inlet bore and a larger outer passage disposed proximate to said notch, and a passage annular shoulder interposed between said inner and outer passages; and said pressure indicator includes a tubular coil having a closed first end and an open second end, said coil disposed to form a flexible, generally planar spiral with said first end proximate to the circumferential edge of said coil and said second end proximate to the center of said coil;

a bushing defining a bushing annular shoulder and a stepped-bore orifice including a smaller inner orifice and a larger outer orifice, said bushing annular shoulder disposed exterior to said bushing and proximate to said inner orifice, and said bushing disposed within said outer passage so that said inner orifice is proximate to said inlet bore;

an O-ring disposed around said bushing at said bushing annular shoulder and bearing against said passage annular shoulder so that sealed fluid connection is made between said bushing and said passage;

a connecting tube, partially disposed within said stepped-bore orifice, and attached between said second end and said bushing whereby sealed fluid connection is made between said bushing and said coil, and variations in fluid pressure in said inlet bore cause variations in the diameter of the planar spiral formed by said coil, producing movement of said first end;

a pointer attached to said coil proximate to said first end; and an indicia plate attached to said regulator housing within said notch and disposed proximate to said pointer.

10. A pressure indicator regulator assembly for a gas flow control device as defined in claim 7, wherein said pressure indicator comprises:

a tubular coil having a closed first end and an open second end, said coil disposed to form a flexible, generally planar spiral with said first end proximate to the circumferential edge of said coil and said second end proximate to the center of said coil;

a connecting tube, disposed through said passage and attached between said second end and said regulator housing whereby sealed fluid connection is made between said inlet bore and said coil, and variations in fluid pressure in said inlet bore cause variations in the diameter of the planar spiral formed by said coil, producing movement of said first end in the plane defined by said coil;

a pointer attached to said coil proximate to said first end; and indicia disposed proximate to said pointer.

11. A pressure indicator regulator assembly for a gas flow control device as defined in claims 10 wherein said indicia includes:

an indicia plate; and means for removably attaching said indicia plate to said regulator housing within said notch.

12. A pressure indicator regulator assembly for a gas flow control device, the pressure indicator regulator assembly being positioned in sealed fluid connection between a gas inlet and a gas outlet respectively defined in the gas flow control device, the pressure indicator regulator assembly comprising:

a generally cylindrical regulator housing defining a gas inlet bore, a regulator cavity, a gas outlet bore, a recessed notch and a passage, said gas inlet bore capable of sealed fluid connection with the gas inlet, said regulator cavity disposed fluidly connecting said inlet bore and said outlet bore, said gas outlet bore capable of sealed fluid connection with the gas outlet, said notch defining a partial disk-shaped volume formed by a generally planar rectangular rear surface, a generally planar arched first end surface and a generally planar arched second end surface, with said rear surface disposed generally parallel to the axis defined by said housing and said first and second end surfaces disposed adjacent to opposing edges of and normal to said rear surface, and said passage disposed fluidly connecting said inlet bore and said rear surface;

a pressure indicator disposed within said notch and in sealed fluid connection with said passage;

a partial disk-shaped pressure indicator cover having a transparent, rounded generally outer surface, a generally planar arched first side surface, and a generally planar arched second side surface, the radius of said outer surface substantially the same as the radius of said regulator housing, and said first and second side surfaces disposed adjacent to opposing edges and normal to the axis of said outer surface, the dimensions of said cover chosen so that said cover may engage said notch with the axis defined by said outer surface generally coaxial with the axis defined by said regulator housing, said first side surface disposed adjacent to said first end surface, and said second side surface disposed adjacent to said second end surface, said outer surface and the exterior of said regulator housing thereby forming a generally smooth, continuous cylindrical surface; and means for removably attaching said cover within said notch.

13. A pressure indicator regulator assembly for a gas flow control device as defined in claim 12, wherein:

said first and second end surfaces each defines at least one slot;

said first and second side surfaces each defines at least one recessed channel; and said means for removably attaching said cover within said notch comprises at least a pair of arms, each arm having a projecting finger, at least one of said arms flexibly and resiliently attached to each of said first and second side surfaces proximate to said channels whereby said cover is removably attachable to said regulator housing within said notch by flexing said arms with respect to said cover and disposing each of said fingers within one of said slots.

14. A pressure indicator regulator assembly for a gas flow control device as defined in claim 13, wherein said pressure indicator comprises:

a flattened tubular coil having a closed first end and an open second end, said coil disposed to form a flexible, generally planar spiral with said first end proximate to the circumferential edge of said coil and said second end proximate to the center of said coil;

a seal;

a connecting tube attached to said second end and removably attached to said regulator housing with said seal interposed between said tube and said regulator housing whereby sealed fluid connection is made between said inlet bore and said coil, and variations in fluid pressure in said inlet bore cause variations in the diameter of the planar spiral formed by said coil, producing movement of said first end in the plane defined by said coil;

a pointer attached to said coil proximate to said first end; and an indicia plate attached to said regulator housing within said notch and disposed proximate to said pointer.

15. A pressure indicator regulator assembly for a gas flow control device as defined in claim 13, wherein:

said passage is formed to define a stepped-bore including a smaller inner passage disposed proximate to said inlet bore and a coaxial larger outer passage disposed proximate to said notch, and a passage annular shoulder interposed between said inner and outer passages; and said pressure indicator includes:

a flattened tubular coil having a closed first end and an open second end, said coil disposed to form a flexible, generally planar spiral with said first end proximate to the circumferential edge of said coil and said second end proximate to the center of said coil;

a bushing defining a bushing annular shoulder and a stepped-bore orifice including a smaller inner orifice and a coaxial larger outer orifice, said bushing annular shoulder disposed exterior to said bushing and proximate to said inner orifice, and said bushing disposed within said outer passage so that said inner orifice is proximate to said inlet bore;

an O-ring disposed around said bushing at said bushing annular shoulder and bearing against said passage annular shoulder so that sealed fluid connection is made between said bushing and said passage;

a connecting tube, partially disposed within said stepped-bore orifice, and attached to said second end and said bushing whereby sealed fluid connection is made between said bushing and said coil, and variations in fluid pressure in said inlet bore cause variations in the diameter of the planar spiral formed by said coil, producing movement of said first end in the plane defined by said coil;

a pointer attached to said coil proximate to said first end; and an indicia plate attached to said regulator housing within said notch and disposed proximate to said pointer.

16. A pressure indicator regulator assembly for a gas flow control device as defined in claim 13, wherein said pressure indicator comprises:

a flattened tubular coil having a closed first end and an open second end, said coil disposed to form a flexible, generally planar spiral with said first end proximate to the circumferential edge of said coil and said second end proximate to the center of said coil;

a connecting tube, disposed through said passage and attached between said second end and said regulator housing whereby sealed fluid connection is made between said inlet bore and said coil, and variations in fluid pressure in said inlet bore cause variations in the diameter of the planar spiral formed by said coil, producing movement of said first end in the plane defined by said coil;

a pointer attached to said coil proximate to said first end; and indicia disposed proximate to said pointer.

17. A pressure indicator regulator assembly for a gas flow control device as defined in claims 16 wherein said indicia includes:

an indicia plate; and means for removably attaching said indicia plate to said rear surface.

* * * * *